United States Patent [19]

Baker

[11] 4,052,111
[45] Oct. 4, 1977

[54] BOGIE-WHEEL SHAFT LUBRICATION SYSTEM

[76] Inventor: Harry L. Baker, 7087 4th St., Lakeport, Mich. 48060

[21] Appl. No.: 633,635

[22] Filed: Nov. 20, 1975

[51] Int. Cl.² .......................................... B62D 55/10
[52] U.S. Cl. ...................................... 305/14; 305/27
[58] Field of Search ....................... 305/14, 27, 24, 28; 180/5 R

[56] References Cited

U.S. PATENT DOCUMENTS

| | | | |
|---|---|---|---|
| 2,425,219 | 8/1947 | Armington | 305/14 |
| 3,463,561 | 8/1969 | Lamb | 305/27 |

Primary Examiner—Robert B. Reeves
Assistant Examiner—John P. Shannon
Attorney, Agent, or Firm—Andrew R. Basile

[57] ABSTRACT

In a suspension system assembly for the resiliently biased rolling support of an endless track on a vehicle chassis, a trailing frame assembly is provided for pivotally supporting wheels mounted for rotation one behind the other in a longitudinal direction of the chassis. The wheels are resiliently urged downwardly and forwardly with respect to the vehicle against the inner surface of an endless track of a vehicle, such as a snowmobile. The system comprises a trailing frame assembly including a tubular sleeve that is pivotally attached to the vehicle chassis by means of a cylindrically shaped bearing shaft that has axial passages extending from grease fittings at the opposite bolt mounting ends of the shaft inwardly for communication with diametrically extending passages opening to the outer surface of the shaft for communicating grease for lubrication of the interface between the outer surface of the shaft and the inner surface of the tubular sleeve.

2 Claims, 4 Drawing Figures

BOGIE-WHEEL SHAFT LUBRICATION SYSTEM

BACKGROUND OF THE INVENTION

I. Field of the Invention

The present invention relates to an improved suspension system for vehicles, such as snowmobiles, that derive their support from an endless belt or track supported on a resilient biased suspension system including bogie-wheel suspension assemblies and, in particular, the present invention relates to a means for providing lubrication for such bogie-wheel suspension assemblies.

II. Description of the Prior Art

As is well known in the art of suspension systems means must be provided for applying the weight of a track snow vehicle upon the ground engaging portion of the track in as uniform a manner as possible. To effect this end, wheel bogies have been used which carry one or more relatively small wheels or alternately skids, that contact the upper surface of the ground-engaging portion of the track. Such systems, when properly designed, afford good traction and do not necessitate the use of an objectionally heavy suspension component. Examples of such systems are disclosed in U.S. Pat. No. 3,761,144. In this system a bogie-wheel suspension assembly is provided for the resiliently biased rolling support of an endless track on a vehicle chassis. The system comprises a trailing frame assembly adapted at its upper part for pivotal attachment to the vehicle chassis by means of a tubular sleeve through which a bearing shaft is inserted for connection to the vehicle chassis. A lower part of the trailing frame is pivotally connected to a wheel support member having at least two wheels mounted for rotation thereon behind the other in a longitudinal direction of the chassis. The trailing frame has a spring connection with the chassis for resiliently urging the frame and the wheels downwardly and forwardly with respect to the vehicle against the inner surface of the track to provide a support for the endless track of the snowmobile. This arrangement has been necessary to provide lubrication between the interface of the outer surface of the shaft and the inner surface of the tubular sleeve. In order to achieve this, it has been necessary to disconnect the entire bogie-wheel suspension assembly from the chassis and remove the same such that the shaft may be removed from the tubular sleeve and grease or other suitable lubricant inserted therein between the sleeve and the shaft. In some applications it is not uncommon to use as many as 12 to 16 bogie-wheels which necessitate a considerable effort in order to remove the bogie-wheel suspension assembly in order to provide for proper lubrication. Because of the extensive amount of work necessary to lubricate the bogie-wheel shaft, it is not uncommon for owners of such snowmobiles to bypass this necessary operation. As a result, the bogie-wheel shaft tends to wear out prematurely necessitating the expensive replacement of the same.

SUMMARY OF THE INVENTION

The present invention, which will be described subsequently in greater detail, comprises a unique and simple means for lubricating a bogie axial of a bogie-wheel suspension assembly.

It is therefore an object of the present invention to provide a new and improved bogie-wheel suspension assembly for snowmobiles and the like which includes means for lubricating the bogie-wheel suspension shaft without the need for removing the bogie-wheel suspension assembly from the snowmobile chassis.

Other objects, advantages, and applications of the present invention will become apparent to those skilled in the art of bogie-wheel suspension assemblies when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views and wherein.

DESCRIPTION OF THE PREFERRED EMBODIMENT

Figure 1:
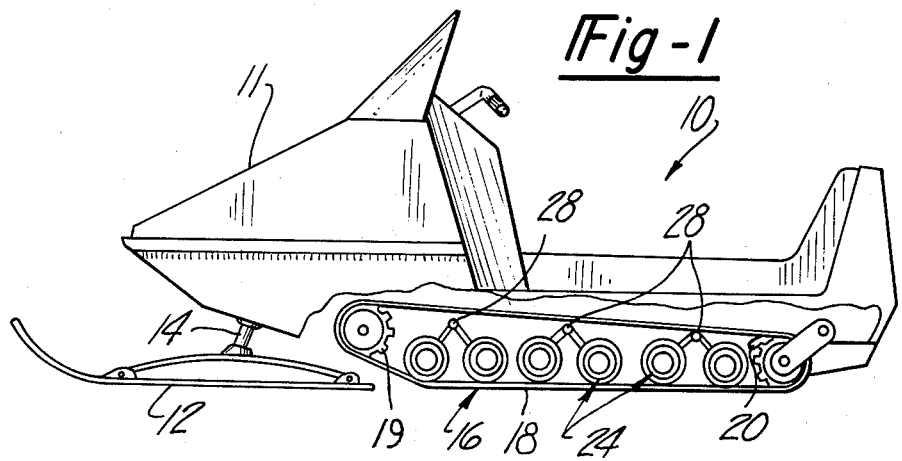
FIG. 1 is a side elevational view of the suspension assembly of the present invention as installed in a snowmobile.

Referring now to the drawing and, in particular, to FIG. 1 wherein there is illustrated one example of the present invention in the form of a snowmobile 10 employing the resilient track suspension system having applicant's inventive lubricating system therein. The vehicle 10 consists of a main, passenger-carried body section or frame 11, which also provides a housing for an internal combustion engine (not shown). The body frame 11 is mounted and supported at its forward end by a pair of short skis 12 which are utilized for steering and are controllable by ski legs 14. The vehicle is supported along its remaining body length by a track assembly 16. The track assembly 16 includes an endless track 18 which is adapted to be engaged by a pair of main driving sprockets 19 which are driven directly by the engine and a pair of idler sprockets 20 adjustably mounted toward the rear of the vehicle body frame 11.

Figure 2:
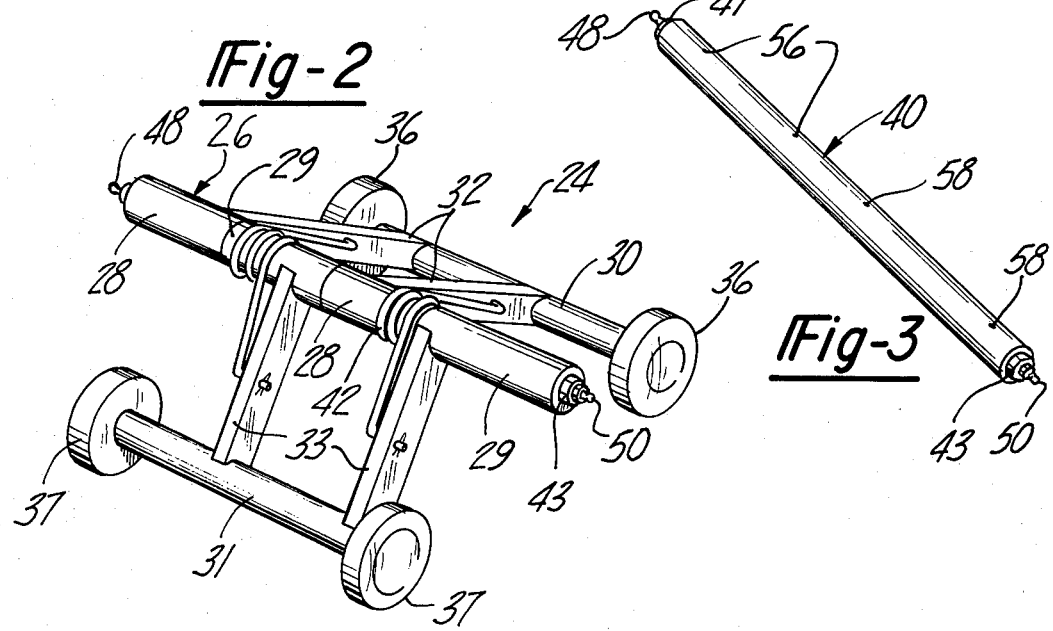
FIG. 2 is a perspective view of a single suspension unit incorporating the inventive lubricating system.

The invention, as disclosed in FIGS. 1 and 2 of the drawing, provides a plurality of resiliently biased wheel supporting assemblies 24 to support the ground engaging surface of the endless track 18 and the vehicle body frame 11. The number of assemblies 24 utilized will obviously depend upon the length of the vehicle and its supporting track. The assemblies 24 disclosed in FIG. 1 are therefore not intended as a limitation but merely as an example of an application for applicant's inventive lubricating system.

Figure 3:
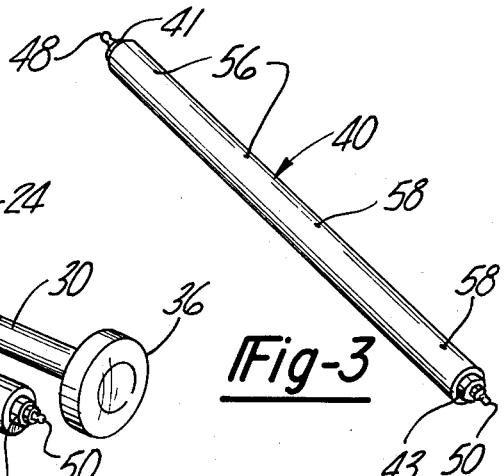
FIG. 3 is a perspective view of the bogie shaft used to support the bogie-wheel suspension assembly, illustrated in FIGS. 1 and 2 of the drawings.

Referring now to FIGS. 2 and 3 of the drawing, it can be seen that each assembly 24 comprises a main trailing frame 26 which is made up in this embodiment by axially-spaced upper tubular sleeves 28 and 29 and lower tubular members 30 and 31, which are connected by trailing arm members 32 and 33, respectively. The lower tubular members 30 and 31 are, respectively, pivotally connected to a pair of wheels 36 and 37 in any suitable manner. The pivotal connection between the trailing frame 26 and the chassis takes the form of the tubular sleeves 28 and a cylindrically-shaped bearing shaft 40 which extends through the tubular sleeves 28 for maintaining the sleeves in axial alignment. The shaft 40 is detachably secured to the vehicle chassis by means of conventional bolts 41 and 43 which extend through vehicle brackets 45 and into a threaded engagement with the opposite ends of the bearing shaft 40, as will be described in greater detail hereinafter. The trailing frame assembly 24 further comprises a pair of torsion springs 42 mounted over each of the outwardly projecting ends of the tubular members 28 with one end of each spring 42 being fixedly held by the arm members 32 on one side of the upper tubular members 28, while the other ends of the springs 42 are engageable with the arm members 33 on the other side of the tubular members 28. The springs 42 therefore associated with the trailing frame 26 urge the wheels 36 and 37 downwardly against the inner surface of the ground-engaging portion of the track 18, thus, providing flexing of the suspension assembly upwardly and rearwardly with respect to the longitudinal direction of the chassis, all of which is described in greater detail in the aforementioned U.S. Letters Patent.

Figure 4:
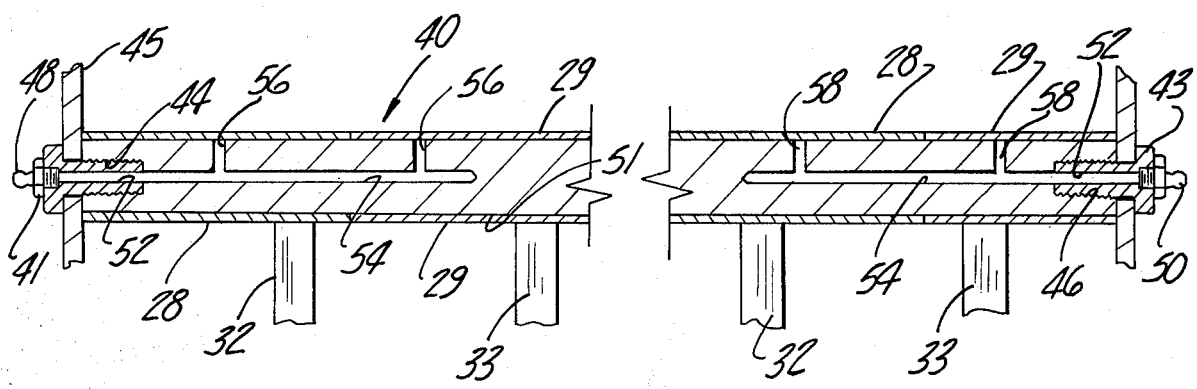
FIG. 4 is a fragmentary longitudinal sectional view of the bogie axial illustrated in FIG. 3 of the drawing.

As aforementioned, the cylindrically-shaped bearing shaft 40 is threaded at its opposite ends at 44 and 46 for threadedly receiving the fastening bolts 41 and 43, respectively. The conventional bolts 41 and 43 are modified in that they are provided with longitudinal through bores 52 which receive grease fittings 48 and 50 within their outside ends, as shown in FIG. 4. The grease fittings 48 and 50 are preferably press fitted into the bolt bores 52 to secure the fittings to the bolt ends. The shaft 40 is provided with axial passages 54 which extend from the threaded ends 44 and 46 into the shaft to intersect diametrically extending passages 56 and 58 which, in turn, open on the outside surface of the shaft 40. It can thus be seen that, when the bogie-wheel suspension assembly is in its assembled position within the vehicle chassis, lubricating grease may be provided in the clearance space between the inside surface of the tubular sleeve 28 and the outside surface of the bearing shaft 40 simply by means of connecting a suitable lubricating tool to the grease fittings 48 and 50 and filling the clearance space with grease. It is preferred that the clearance space be filled with grease before installation, and that after suitable intervals of use the bogie axle 40 should be greased in a conventional manner by means of the grease fittings 48 and 50. It can be seen that by means of the grease fittings and axial passageways 52 and 54 and the diametrically extending passageways 56 and 58, grease may be placed on the major wear points of the bogie suspension system so as to improve the ride and the life of the bearing shaft 40.

It should be understood by those skilled in the art that, even though the present invention has been disclosed with respect to two pairs of wheels, other forms of suspension systems for snowmobiles, such as skid element suspension systems, may incorporate applicant's inventive lubricating system, and that such systems will remain within the spirit of the invention and the scope of the appended claims.

What is claimed is as follows:

1. A suspension assembly for the resiliently biased rolling support of an endless track on a vehicle chassis, said suspension assembly comprising:

first and second trailing frame assemblies, each having a pair of axially spaced tubular sleeves at one end; said frame assemblies being positioned such that said tubular sleeves are axially aligned and alternately positioned;

a cylindrically spaced bearing shaft positioned through said axially aligned tubular sleeves;

bolts extending through said chassis and axially into threaded engagement with the opposite ends of said shaft to secure said shaft to said chassis and for pivotally attaching said trailing frame assemblies to said chassis, said bolts having longitudinal through bores;

spaced supports rotatably carried by the other end of each of said trailing frame assemblies such that said supports are capable of free rotating movement with respect to its associated trailing frame assembly;

means which cooperate with said trailing frame assemblies to resiliently urge said supports downwardly with respect to said vehicle against the inner surface of said track;

said bearing shaft having first and second noncommunicating axial passageways opening respectively at the opposite ends of said bearing shaft and communicating with the inner ends of said bolt bores; and grease fittings carried at the outer ends of said bolt bores and communicating with said shaft first and second axial passages, each of said axial passages extending from its associated grease fitting into said shaft to intersect with a plurality of axially spaced diametrically extending passages opening at one side of said shaft at locations corresponding to the locations of said axially spaced tubular sleeves for communicating grease stored within said axial passages to the outer surface of said shaft for providing lubrication of the interface between the outer surface of said shaft and the inner surface of said tubular sleeves.

2. The suspension assembly defined in claim 1 wherein said means for resiliently urging said supports comprises springs mounted upon said tubular sleeves, said springs being held in part by said trailing frame assembly.

* * * * *